United States Patent [19]

Smith

[11] 4,082,242
[45] Apr. 4, 1978

[54] OMNIDIRECTIONAL SEWER HOSE SUPPORT

[76] Inventor: James B. Smith, P.O. Box 481, Fullerton, Calif. 92632

[21] Appl. No.: 716,389

[22] Filed: Aug. 23, 1976

[51] Int. Cl.² .............................................. F16L 3/00
[52] U.S. Cl. ...................................... 248/83; 138/106; 248/49; 248/167; 248/174
[58] Field of Search ................... 248/83, 80, 75, 436, 248/174, 167, 49, 85, 87; 138/106; 137/344; 4/114

[56] References Cited

U.S. PATENT DOCUMENTS

| 1,329,955 | 2/1920 | Busby | 248/436 X |
| 2,571,388 | 10/1951 | Shanahan | 248/83 |
| 2,647,381 | 8/1953 | Lamounette | 248/167 |
| 3,021,102 | 2/1962 | Kuempel | 248/80 X |
| 3,146,025 | 8/1964 | Heaney | 248/167 X |
| 3,169,741 | 2/1965 | Bittner | 248/49 |
| 3,572,622 | 3/1971 | Smith | 248/49 |
| 3,819,137 | 6/1974 | Smith | 248/83 X |

Primary Examiner—Roy D. Frazier
Assistant Examiner—Rodney H. Bonck
Attorney, Agent, or Firm—William H. Maxwell

[57] ABSTRACT

An omnidirectional sewer hose support comprised of a multiplicity of interconnected arches of planar form adapted to be deflected from an adjacently related stored condition and into an angular relationship and upstanding condition extended in a zig-zag formation to transversely underlie the hose for its support and by engaging in the reinforcement configuration of the hose to prevent shifting thereof.

7 Claims, 6 Drawing Figures

U.S. Patent      April 4, 1978      4,082,242
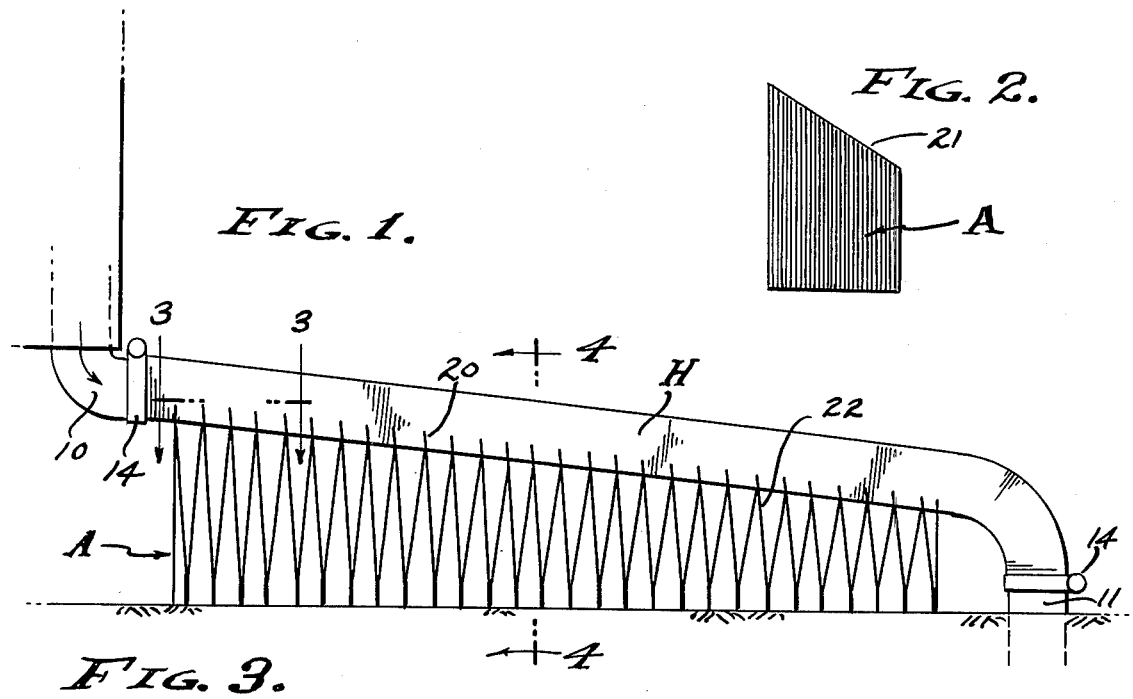
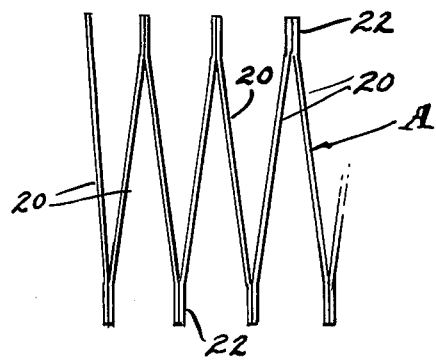
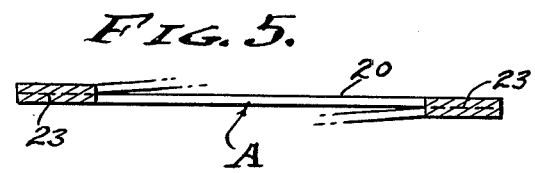
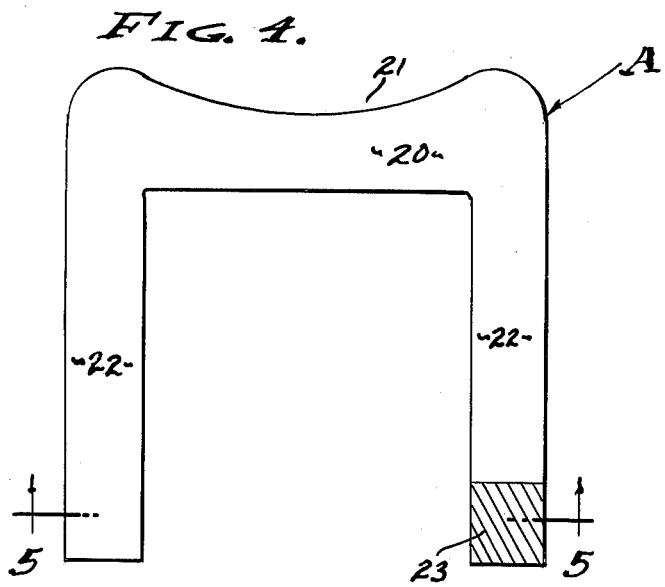
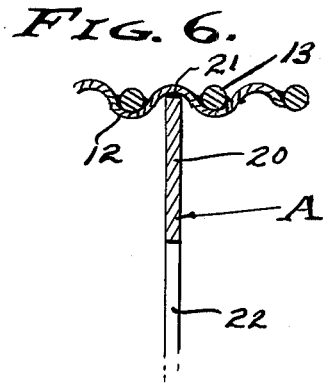

OMNIDIRECTIONAL SEWER HOSE SUPPORT

BACKGROUND

Connection to a sewer is a requirement for trailer homes, campers and motor homes, there being sanitation connections at both the vehicle and park facility for this purpose, and which involves the installation of a flexible hose to extend therebetween. Such hoses are light weight tubes adapted to be stored and to be extended for use, with clamps or the like to ensure fluid tightness at both the vehicle outlet and park drain pipe. In practice, those hoses are made of plastic reinforced by circumferential accordion folds or convolutions with or without helical wire bracing, and as such are extensible from, for example, 20 inches to 10 foot in length. It is significant that due to lightness in construction these hoses are very flexible, so that they deflect and sag when subjected to the weight of waste bearing liquids. To this end it is customary to support these sewer hoses with improvised props or with some racks designed for this purpose, and because of the requirement for drainage fall it is necessary to support the hose high at the inlet end and low at the outlet end; and consequently the usual rack for this purpose is cumbersom to say the least. Characteristically, the vehicle outlet connection is at the high elevation above the ground surface, while the park disposal drain inlet is at and/or slightly above the ground surface. Therefore, it is an object of this invention to provide omnidirection flexibility in a sewer hose support, such that height, fall and horizontal location are accommodated with each installation.

The parking of a trailer home, campers or motor homes is done with nominal precision at best, and to this end the position thereof within a parking space is never exacting. Furthermore, the vehicle outlet connection and the park facility drain connection are never identically placed, and all to the end that a great deal of latitude is required of the flexible sewer hose installation. Therefore, it is an object of this invention to provide an omindirectional sewer hose support that will bend or warp laterally in any direction. With the present invention, the sewer hose can be bent or warped into curvatures of a practical minimum which the support per se exceeds. That is, the support hereinafter described can be bent or warped to the curvature of any known sewer hose of the type under consideration, to underlie and support the same.

The parking surface and elevation of the park facility drain connection is never identically placed, and therefore it is an object of this invention to provide an omnidirectional sewer hose support that will bend or warp vertically to any axis of connection. With the present invention, the sewer hose ends can be bent or warped into any height alignment with the vehicle and park connections, and the support hereinafter described follows the contour or said hose for its coextensive engageable support.

The fall of a waste bearing hose is all important in order for it to drain properly. To this end it is an object of this invention to provide a declined support, with opposite ends at the heights of the vehicle outlet and park facility inlet connections respectively. With the present invention, there is a series of interconnected arches of ever decreasing height each supportably engaging a portion of the flexible hose.

It is an object to provide a sewer hose support having the features hereinabove referred to and comprised of a multiplicity of like arches joined together in a series that is expandible from a collapsed storage condition into an extended and omniflexible utilitarian condition. In carrying out this invention, the arches are planar elements of resilient material, one joined to the other in a manner to permit substantial separation of adjacent arches, and each arch with a header extending transversely to engage in a corrugation of or with a circumferential reinforcement of the hose.

It is also an object of this invention to provide an extremely simple and practical support for the purposes ascribed thereto hereinabove, and an article that is inexpensively produced of like permanently interconnected parts. The support is ominidirectional as is the sewer hose, and the rate of fall can be uniformly increased or decreased as circumstances require. And in all installations the support reaches coextensively beneath the sewer hose between the opposite end connections thereof.

DRAWINGS

The various objects and features of this invention will be fully understood from the following detailed description of the typical preferred forms and application thereof, throughout which description reference is made to the accompanying drawings, in which:

FIG. 1 is a side elevation of the hose support in an extended working condition.

FIG. 2 is a view showing the hose support in its collapsed storage condition.

FIG. 3 is a plan view taken substantially as indicated by lne 3—3 on FIG. 1.

FIG. 4 is an enlarged elevation of the hose support arch which characterizes this invention and taken substantially as indicated by line 4—4 on FIG. 1.

FIG. 5 is a detailed section taken as indicated by line 5—5 on FIG. 4, and

FIG. 6 is a detailed view showing the supported engagement of the hose with the support.

PREFERRED EMBODIMENT

This invention relates to trailer homes, campers and motor homes or the like which have sewage facilities for the disposal of waste. These are vehicles which patronize park facilities where sewage drains are provided, the vehicle outlet connection being substantially higher than the park facility drain connection. The parking area connection does not always correspond to the location of the vehicle connection, and to this end flexible hose is required for the interconnection with which we are here concerned. That is, both horizontal and vertical alignments must be adjusted to, without exception, while maintaining a sloped hose that will clear itself of waste. Otherwise spilage will occur upon disconnection, as and when pockets of fluid waste accumulate within the hose. As shown, there is a vehicle sewage outlet fitting 10 at the frame level of the vehicle, and there is a park facility inlet drain fitting 11 opening at or slightly above the ground or pavement level of the parking area. As shown, these openings are spaced both horizontally and vertically so that drainage occurs from the vehicle fitting 10 to the park fitting 11, by virtue of the fall or declination of a hose H disposed therebetween. A typical hose H is shown in the form of a thin walled plastic tube with circumferential corrugations 12 reinforced as by a helical wire 13. A flexible hose of this description can be extensible from a compressed condition 20 inches in length to a utilitarian condition up to 10 feet in length, and simultaneously bent or warped into any reasonable curvature required. As shown, the opposite ends of the hose H are coupled to the fittings 10 and 11 as by means of hose clamps 14 or the like.

Referring now to the hose support of the present invention, a multiplicity of like arches A are interconnected in a series adapted to be adjacently stacked for storage and to be extended for erection and support of a hose or the like. A feature of the support is the planar character of the arches that are linked one to the other at alternately remote points of joinder, so as to be extensible from the collapsed condition. Accordingly, advantage is derived from utilizing resiliency in the material of which the arches are formed, and all to the end that the support yields under tension when extended and springs back to the collapsed position when released. However, the degree of deflection in each arch is relatively slight so that the weight of the sewer hose and support interengagement with the convoluted exterior thereof holds the support in working position. Another feature of the support is that the arches A decline in height from one end of the support to the other. In practice thirty-six arches are employed, the highest being nine inches and the lowest being four inches, this support being extensible to eight to ten feet with a fall of five inches which is ample to ensure drainage.

The arches A are alike and vary only as to height. In accordance with this invention each arm A is a planar member of relatively stiff material such as light weight plastic, for example polystyrene which has high impact qualities as well as being flexible and resilient. The hose H is nominally three inches in diameter in which case the arch is considerably wider or of six inches or more width, with a transverse header 20 that is concaved to present a saddle 21 to center the hose. In practice, the concavity of the saddle 21 is of slightly greater radius than the hose, so as to permit some lateral movement of the hose upon the supporting arch. A feature is that each arch A has opposite depending legs 22 individually flexible relative to each other, there being a leg at each side of the arch and extending perpendicularly to a coplanar supporting plane. The legs of each successive arch are taller than the next adjacent arch in the direction of declination. Accordingly, it will be seen that each arch A is a planar member with a horizontally disposed transverse header 20 having a pair of spaced depending legs 22 perpendicularly disposed at the opposite sides of the header. In practice, the header and legs have a cross section of 1/10 inch by one inch, nominally.

In accordance with this invention the arches hereinabove described are assembled in adjacent relationship, one flat against the other, and permanently interconnected alternately at opposite legs 22, and at the ground engaging end portions of said legs. As shown, each leg has a lowermost area 23, approximately one to one and a half inches in height, reserved for permanent joinder to the next adjacent arch leg. That is, the leg 22 at one side of an arch A is secured at its area 23 to a preceeding arch A, while its other leg area 23 is secured to a succeeding arch A. Thus is will be seen that the alternate and lowermost portions of the arches are alternately interconnected and that the remaining interfaces of the arches are free.

Joinder and/or securement of the adjacently related arches is accomplished as by using an adhesive or solvent, or as by means of heat welding, restricted to the areas 23. By linking the lowermost portions 23 of the alternately opposite side legs 22, the interconnected series or arches spring open in zig-zag form as viewed in both elevation and plan (see FIGS. 1 and 3). Vertical stability is established by virtue of the resilient interconnection and longitudinal spreading of the legs 22. However, the arches A spring back into compact adjacency when released (see FIG. 2).

From the foregoing it will be seen that I have provided a very simple and practical combination of arches that is compact for storage, and extensible for use as a hose support. The sewer hose H rests in the multiplicity of saddles 21 that enter between the hose corrugations formed by the reinforcement convolutions thereof, to engage therein so as to position the hose longitudinally. Conversely, the support is held longitudinally by the hose. It will be seen that resiliency and flexibility is inherent in the support formed of the interconnected arches A that are bent or warped one from the other as circumstances require, and all to the end that the legs 22 project to decreasing height as the support extends from the vehicle outlet waste fitting 10 to the park facility drain fitting 11, while bending or warping laterally as well as to align therewith.

Having described only a typical preferred form and application of my invention, I do not wish to be limited or restricted to the specific details herein set forth, but wish to reserve to myself any modifications or variations that may appear to those skilled in the art:

I claim:

1. A drain hose support for making up vehicle-to-park facility sewer connections, said support having a vehicle connection end and a park facility connection end, and including; a series of like vertically disposed and adjacently related arches of flexible material having coplanar bottom edges adapted for ground engagement and each having a hose supporting header at a fixed height successively diminished progressing from the vehicle connection end to the park facility connection end thereof and opposite side legs depending therefrom, the endmost arches having one free side leg, and interconnecting means at alternately opposite side legs of all intermediate arches joining the series of arches for flexible separation from adjacency and into a longitudinally extended linked relation to supportably engage the drain hose disposed to decline in elevation from the vehicle-to-park facility sewer connections.

2. The drain hose support as set forth in claim 1, wherein the like arches are flat members of planar material.

3. The drain hose support as set forth in claim 1, wherein the alternately opposite side legs of the arches are joined at their lowermost end portions only.

4. The drain hose support as set forth in claim 1, wherein the like arches are flat members of planar material and the alternately opposite side legs thereof joined at their lowermost end portions only.

5. The drain hose support as set forth in claim 1, wherein the headers are transversely concaved for hose support engagement.

6. The drain hose support as set forth in claim 1, said support being adapted for use with a drain hose having circumferential hose convolutions and wherein the headers are transversely disposed and engageable between axially spaced circumferential hose convolutions to position the said hose and said arches with respect to each other.

7. The drain hose support as set forth in claim 1, said support being adapted for use with a drain hose having circumferential hose convolutions and wherein the arches are transversely disposed members of planar material and the headers thereof having concaved upper edges engageable between axially spaced circumferential hose convolutions to position the said hose and said arches with respect to each other.

* * * * *